(12) United States Patent
Kim et al.

(10) Patent No.: US 8,570,465 B2
(45) Date of Patent: Oct. 29, 2013

(54) LIQUID CRYSTAL DISPLAY

(75) Inventors: Ji-Sun Kim, Seoul (KR); Bong Hyun You, Yongin-si (KR); Chong-Chul Chai, Seoul (KR); Yeong-Keun Kwon, Yongin-si (KR); Mi-Seon Seo, Seoul (KR)

(73) Assignee: Samsung Display Co., Ltd. (KR)

( * ) Notice: Subject to any disclaimer, the term of this patent is extended or adjusted under 35 U.S.C. 154(b) by 41 days.

(21) Appl. No.: 13/310,591

(22) Filed: Dec. 2, 2011

(65) Prior Publication Data

US 2012/0169955 A1    Jul. 5, 2012

(30) Foreign Application Priority Data

Dec. 31, 2010 (KR) .................. 10-2010-0140619

(51) Int. Cl.
*G02F 1/1335* (2006.01)
*G02F 1/1333* (2006.01)

(52) U.S. Cl.
USPC ............ 349/106; 349/110; 349/129; 349/130

(58) Field of Classification Search
USPC ................... 349/110, 129–130, 106
See application file for complete search history.

(56) References Cited

U.S. PATENT DOCUMENTS

| | | | |
|---|---|---|---|
| 7,212,262 B2 | 5/2007 | Kang | |
| 7,515,225 B2 * | 4/2009 | Park | 349/106 |
| 7,701,538 B2 * | 4/2010 | Kume et al. | 349/129 |
| 7,800,717 B2 * | 9/2010 | Kuribayashi et al. | 349/109 |
| 2006/0097414 A1 | 5/2006 | Chae et al. | |

FOREIGN PATENT DOCUMENTS

| | | |
|---|---|---|
| JP | 08-211223 A | 8/1996 |
| JP | 2006-0330545 A | 12/2006 |
| JP | 2007-033744 A | 2/2007 |
| KR | 1020060101084 A | 9/2006 |
| KR | 1020060116878 A | 11/2006 |
| KR | 1020080058538 A | 6/2008 |
| KR | 1020100077979 A | 7/2010 |

* cited by examiner

*Primary Examiner* — James Dudek

(74) *Attorney, Agent, or Firm* — Innovation Counsel LLP

(57) ABSTRACT

An exemplary embodiment of the present invention provides a liquid crystal display including: a first insulating substrate; a light blocking member positioned on the first insulating substrate and having a frame portion defining openings for pixels; a step compensated pattern positioned on the first insulating substrate and in one of the openings; a second insulating substrate facing the first insulating substrate; a first electrode formed on the first insulating substrate in the same layer as a second domain dividing unit; a second electrode facing the first electrode and disposed in the same layer as the first domain dividing unit; and a liquid crystal layer interposed between the first electrode and the second electrode, wherein the step compensated pattern overlaps the first domain dividing unit or the second domain dividing unit.

11 Claims, 6 Drawing Sheets

LIQUID CRYSTAL DISPLAY

CROSS-REFERENCE TO RELATED APPLICATION

This application claims priority to and the benefit of Korean Patent Application No. 10-2010-0140619 filed in the Korean Intellectual Property Office on Dec. 31, 2010, the entire content of which is incorporated herein by reference.

BACKGROUND OF THE INVENTION (a) Field of the Invention

The present invention relates to a liquid crystal display.

(b) Description of the Related Art

A liquid crystal display is a type of flat panel display that is widely used today. Typically, a liquid crystal display includes two panels on which field generating electrodes such as a pixel electrode and a common electrode are formed and a liquid crystal layer interposed therebetween. A liquid crystal display generates an electric field in a liquid crystal layer by applying a voltage to the field generating electrode, thereby changing the orientations of liquid crystal molecules of the liquid crystal layer. The orientations of liquid crystal molecules affect the polarization of incident light, thereby displaying the desired image.

Color filters used in the liquid crystal display generally display three colors, such as red, green, and blue. In addition, in recent years, a liquid crystal display including a white pixel has been developed in order to increase the luminance of the liquid crystal display.

The above information disclosed in this Background section is only for enhancement of understanding of the background of the invention and therefore it may contain information that does not form the prior art that is already known in this country to a person of ordinary skill in the art.

SUMMARY OF THE INVENTION

In one aspect of the invention, a white pixel employs an insulating layer of a transparent material as the color filter and is not formed through an additional process but may employ a material for flattening a substrate.

However, the red, green, and blue pixels additionally include color filters including pigments and the insulating layer for flattening is positioned on the color filters. Since the white pixel not including the color filters includes an insulating layer for flattening having a height lower than the pixels including the color filters, the white pixel has a problem from the unevenness of the substrate surface.

If the height of the insulating layer of the white pixel decreases, a cell gap of the white pixel becomes larger than those of other pixels.

Accordingly, the present invention has been made in an effort to provide a liquid crystal display having a uniform cell gap by increasing the flatness of a white pixel.

In one aspect, the present invention provides a liquid crystal display including: a first insulating substrate; a light blocking member positioned on the first insulating substrate, the light blocking member having a frame portion defining openings for pixels; a step compensated pattern positioned on the first insulating substrate and in one of the openings; a second insulating substrate facing the first insulating substrate; a first electrode formed on the first insulating substrate in the same layer as a second domain dividing unit; a second electrode facing the first electrode and disposed in the same layer as a first domain dividing unit; and a liquid crystal layer interposed between the first electrode and the second electrode, wherein the step compensated pattern overlaps the first domain dividing unit or the second domain dividing unit.

Each of the pixels may display any one of red, green, blue, and white and the step compensated pattern may be positioned in the white pixel.

The step compensated pattern may be separated from its neighboring step compensated pattern by about 40 to 50 μm.

The red, green, and blue pixels may include a red filter, a green filter, and a blue filter, respectively, and the white pixel may further include a color filter made of a transparent insulating material.

The liquid crystal display may further include: a thin film transistor positioned on the second insulating substrate and electrically connected with the second electrode; and a gate line and a data line connected with the thin film transistor and crossing each other, and the first domain dividing unit and the second domain dividing unit may extend in a direction that intersects the gate line at a non-right angle.

The second electrode may include a first subpixel electrode and a second subpixel electrode to which different voltages are applied.

The second subpixel electrode may receive a voltage lower than the first subpixel electrode and the liquid crystal display may further include a shielding electrode connected with the second subpixel electrode and extending in the same direction as the gate line.

The shielding electrode may be made of the same material as the pixel electrode on the same layer as the pixel electrode.

The liquid crystal display may further include a first switching element and a second switching element connected with the first subpixel electrode and the second subpixel electrode, respectively.

The gate line may include a first gate line and a second gate line, the first switching element and the second switching element may be connected with the data line and the first gate line, and the liquid crystal display may further include a third switching element connected with the second gate line.

The liquid crystal display may further include: a common voltage line disposed in parallel to the gate line and receiving a predetermined voltage; and an auxiliary capacitor connected with the third switching element and the common voltage line.

The second subpixel electrode may receive a voltage lower than the first subpixel electrode, and the liquid crystal display may further include a shielding electrode connected with the second subpixel electrode and extending in the same direction as the gate line, and the shielding electrode may be positioned between the first gate line and the second gate line.

The shielding electrode may be made of the same material as the pixel electrode on the same layer as the pixel electrode.

According to the exemplary embodiments of the present invention, a step compensated pattern is formed to overlap a domain dividing unit of a white pixel to increase the flatness of the white pixel and acquire a uniform cell gap.

Further, the step compensated pattern is formed to overlap the domain dividing unit, to thereby prevent an aperture ratio from being reduced.

DETAILED DESCRIPTION OF THE EMBODIMENTS

Figure 1:
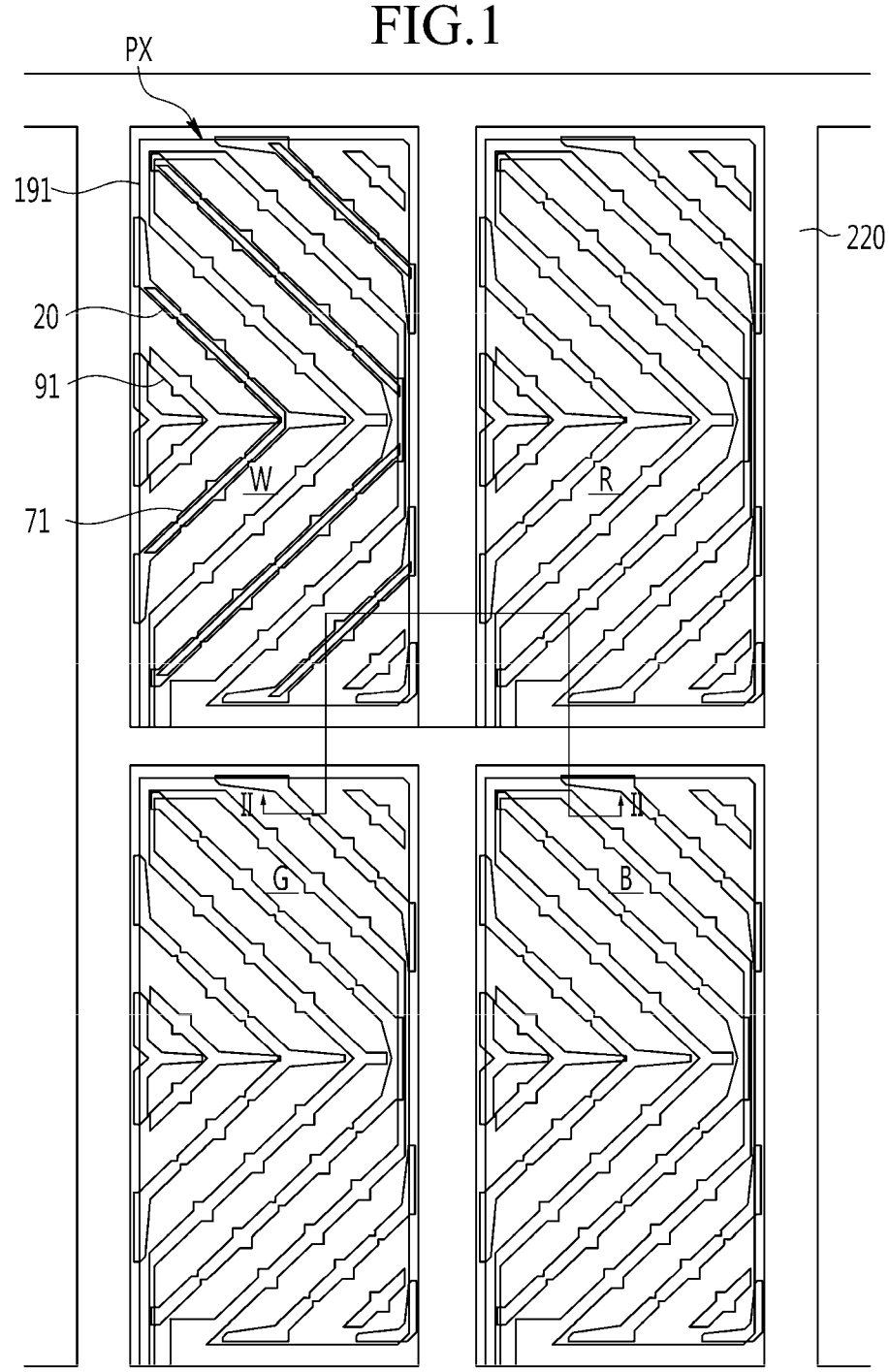
FIG. 1 is a diagram schematically showing a pixel of a liquid crystal display according to an exemplary embodiment of the present invention and a diagram showing a single pixel group constituted by red (R), green (G), blue (B), and white (W) pixels.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
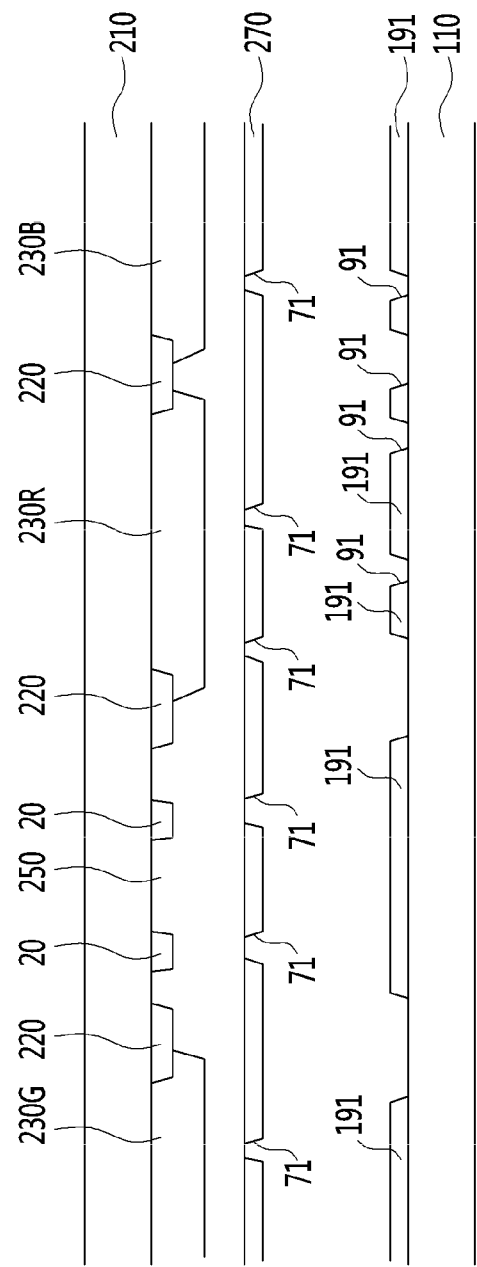
FIG. 2 is a cross-sectional view taken along line II-II of FIG. 1.

FIG. 1 is a diagram schematically showing a pixel of a liquid crystal display according to an exemplary embodiment of the present invention and a diagram showing a single pixel group including red (R), green (G), blue (B), and white (W) pixels, and FIG. 2 is a cross-sectional view taken along line II-II of FIG. 1.

As shown in FIG. 1, the red (R), green (G), blue (B), and white (W) pixels are disposed in a 2×2 matrix and constitute a single pixel group.

Each pixel PX includes a pixel electrode 191 including a first domain dividing unit 91 and a common electrode 270 including a second domain dividing unit 71.

Each pixel PX is divided by a light blocking member 220 and the light blocking member 220 has a frame portion defining an opening that is aligned with the pixel electrode 191 to expose the pixel electrode 191.

Referring to FIG. 2, the light blocking member 220 and a step compensated pattern 20 are positioned on a substrate 10.

The step compensated pattern 20 may be made of the same material as the light blocking member 220. In this case, the step compensated pattern 20 is positioned in only the white pixel and in the opening of the light blocking member 220.

A red color filter 230R, a green color filter 230G, and a blue color filter 230B are positioned at and aligned with the opening of the light blocking member 220. The red, green and blue color filters are made of an organic material including a pigment.

An overcoat 250 made of a transparent organic material is positioned on the red color filter 230R, the green color filter 230G, and the blue color filter 230B.

The step that is formed by the color filter is covered by the overcoat 250, which forms a substantially even surface on the substrate. The overcoat 250 also acts as a white color filter and forms the white pixel. That is, since the overcoat 250 is made of the transparent material, the overcoat 250 allows light that is incident on the white pixel to be transmitted to represent the white color.

Meanwhile, unlike portions of the overcoat 250 positioned on the red color filter 230R, the green color filter 230G, and the blue color filter 230B, the white pixel W has a wide area filled by the overcoat 250. This extra width may result in a lower height of the overcoat 250 in the white pixel than in the color filter due to the step between the adjacent color filters.

However, in the exemplary embodiment of the present invention, presence of the step compensated pattern prevents the height of the overcoat 250 from being lower in the white pixel.

Consecutively positioned step compensated patterns 20 are preferably separated by about 40 to 50 μm. If the separation distance is larger than this, flatness of the overcoat 250 is compromised; if the separation distance is smaller than this, the aperture ratio of the pixel is decreased.

In addition, the common electrode 270 is positioned on the overcoat 250. The common electrode 270 includes a second domain dividing unit 71, which may include a cutout portion and a protrusion (not shown).

The step compensated pattern 20 is disposed to at least partially overlap the second domain dividing unit 71. Accordingly, it is possible to prevent the aperture ratio from being decreased due to the step compensated pattern 20.

In the exemplary embodiment of the present invention, the step compensated pattern 20 is formed on the same substrate as the common electrode 270. However, in other embodiments, the light blocking member 220 may be formed on the same substrate as the pixel electrode 191, and the step compensated pattern 20 may be formed on the same substrate as the pixel electrode 191. In this case, the color filter may be positioned on the same substrate as the pixel electrode 191 and the overcoat 250 may be formed as an interlayer insulating film disposed between the pixel electrode 191 and the color filter.

Hereinafter, a pixel of the liquid crystal display including the pixel will be described in detail with reference to FIGS. 3 and 4.

Figure 3:
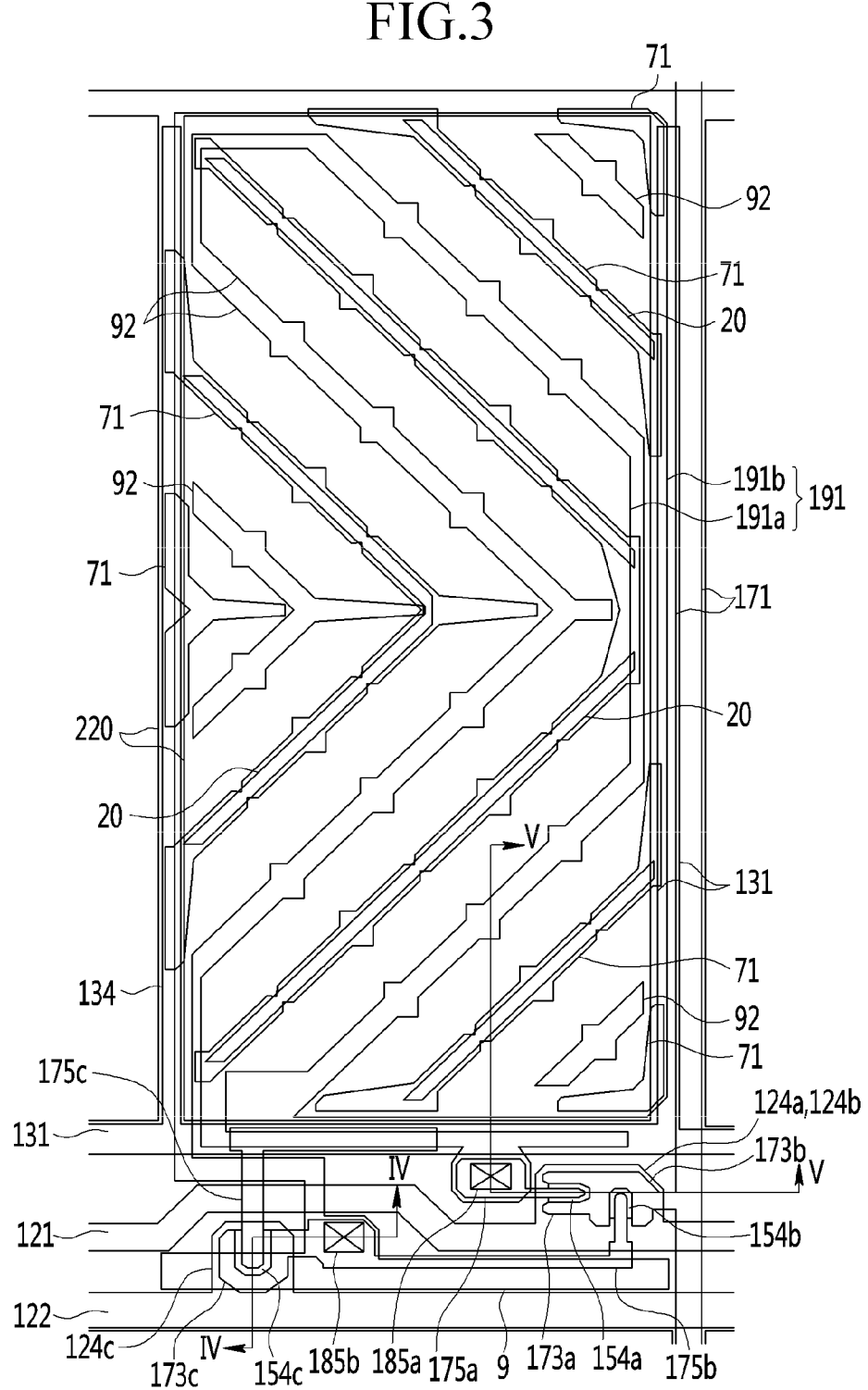
FIG. 3 is a layout view of a liquid crystal display according to an exemplary embodiment of the present invention.
Figure 4:
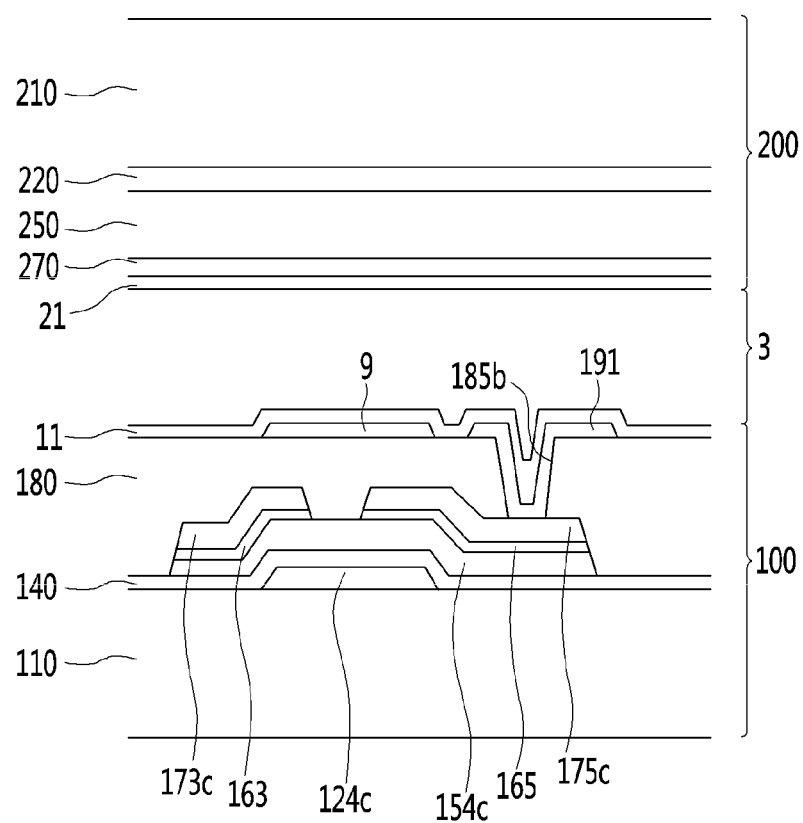
FIG. 4 is a cross-sectional view taken along line IV-IV of FIG. 3.
Figure 5:
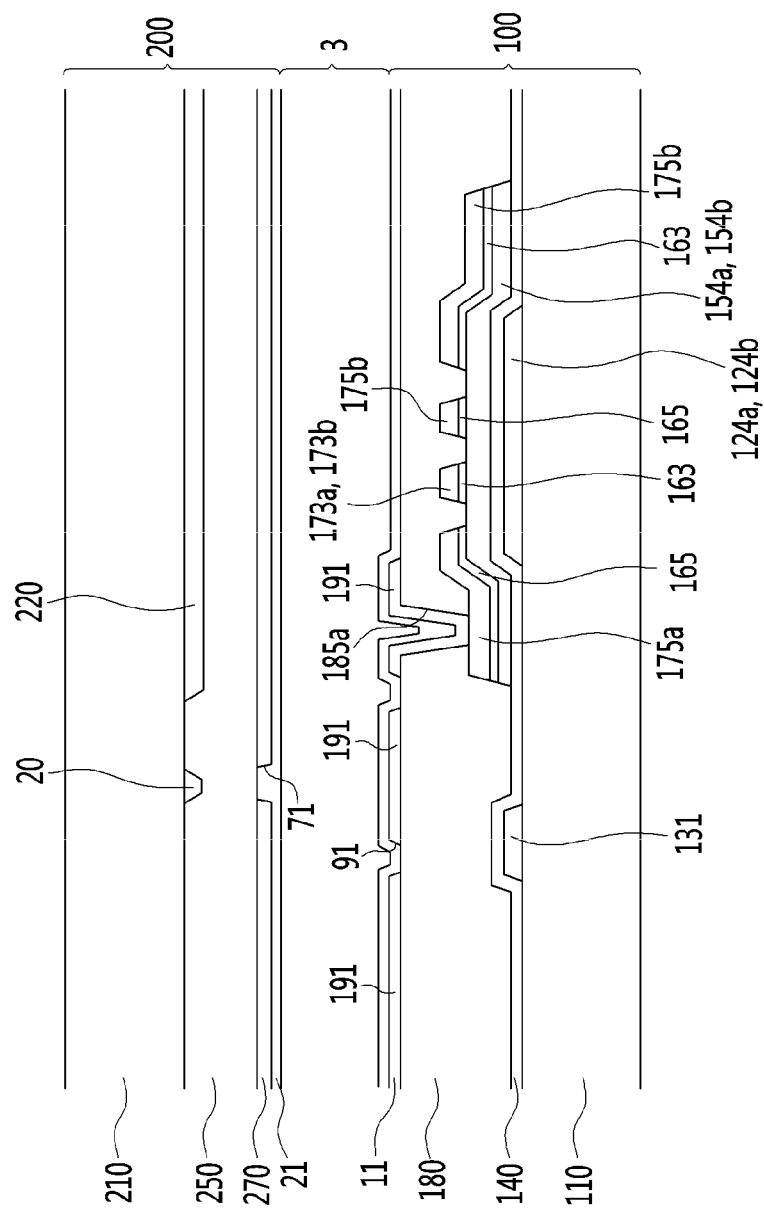
FIG. 5 is a cross-sectional view taken along line V-V of FIG. 3.

FIG. 3 is a layout view of a liquid crystal display according to an exemplary embodiment of the present invention, FIG. 4 is a cross-sectional view taken along line IV-IV of FIG. 3, and FIG. 5 is a cross-sectional view taken along line V-V of FIG. 3.

As shown in FIGS. 3 to 5, the liquid crystal display according to the exemplary embodiment of the present invention includes a lower panel 100 and an upper panel 200 which face each other, and a liquid crystal layer 3 interposed between two panels 100 and 200.

First, the lower panel 100 will be described.

A plurality of gate conductors including a plurality of first gate lines 121, a second gate line 122, and a common voltage line 131 are formed on an insulating substrate 110.

The first gate line 121 and the second gate line 122 extend in a first direction and transmit a gate signal.

The first gate line 121 includes a first gate electrode 124a and a second gate electrode 124b protruding from it away from the second gate line 122. The first gate electrode 124a and the second gate electrode 124b may be connected to each other.

The second gate line 122 includes a third gate electrode 124c protruding from it toward the first gate electrode 121 and the first gate line 121 may be bent at the protruding portion of the third gate electrode 124c.

The common voltage line 131 extends in the first direction and transmits a predetermined voltage such as a common voltage Vcom. The common voltage line 131 includes a pair of extending portions 134 extending away from the first and second gate lines 121, 122 in a direction that is approximately perpendicular to the first gate line 121 or the second gate line 122.

A gate insulating layer 140 is formed on the gate conductor.

A plurality of stripe-shaped semiconductors (not shown) made of amorphous silicon, crystalline silicon, or the like are formed on the gate insulating layer 140. The stripe-shaped semiconductors extend in a second direction and include first and second semiconductors 154a and 154b extending toward the first and the second gate electrodes 124a and 124b and connected to each other, and a third semiconductor 154c overlapping the third gate electrode 124c.

A pair of ohmic contacts 163 and 165 is positioned on the first semiconductor 154a to the third semiconductor 154c, respectively. The ohmic contact 163 may be connected with a stripe-shaped ohmic contact (not shown) disposed on the stripe-shaped semiconductor and the ohmic contact 163 of the first semiconductor 154a may be connected with the ohmic contact 165 of the second semiconductor 154b.

The ohmic contacts 163 and 165 may be made of a material such as n+ hydrogenated amorphous silicon doped by n-type impurities such as phosphorus with a high concentration or silicide.

A data conductor including a plurality of data line 171, a plurality of first drain electrodes 175a, a plurality of second drain electrodes 175b, and a plurality of third drain electrodes 175c is formed on the ohmic contacts 163 and 165 and the gate insulating layer 140.

The data line 171 transmits a data signal and extends in a second direction so as to cross the first gate line 121, the first gate line 122, and the common voltage line 131. Each data line 171 extends toward the first gate electrode 124a and the second gate electrode 124b and includes a first source electrode 173a and a second source electrode 173b connected to each other.

Each of the first drain electrode 175a, the second drain electrode 175b, and the third drain electrode 175c includes one end having a rod shape and the other end having a relatively larger area. The rod-shaped ends of the first drain electrode 175a and the second drain electrode 175b are partially surrounded by the first source electrode 173a and the second source electrode 173b. The wide end of the second drain electrode 175b extends to be connected with the third source electrode 173c, and the third source electrode 173c faces the third drain electrode 175c. The wide end 177c of the third drain electrode 175c overlaps the common voltage line 131 to form an auxiliary capacitor C3.

The first/the second/the third gate electrodes 124a/124b/124c, the first/the second/the third source electrodes 173a/173b/173c and the first/the second/the third drain electrodes 175a/175b/175c constitute first/second/third thin film transistors (TFTs) Qa/Qb/Qc together with the first/the second/the third semiconductors 154a/154b/154c and a channel of the thin film transistor is formed at each of the semiconductors 154a/154b/154c between each of the source electrodes 173a/173b/173c and each of the drain electrodes 175a/175b/175c.

The stripe-shaped semiconductor including the first, second, and third semiconductors 154a, 154b, and 154c may have substantially the same plane shape as a data conductor and ohmic contacts 163 and 165 except for channel regions between the first, second, and third source electrodes 173a, 173b, and 173c and the first, second, and third drain electrodes 175a, 175b, and 175c.

A passivation layer 180 made of an organic insulating material is formed on the data conductor and the exposed first, second, and third semiconductors 154a, 154b, and 154c. A first contact hole 185a exposing a wide end of the first drain electrode 175a and a second contact hole 185b exposing a wide end of the second drain electrode 175b are formed on the passivation layer 180.

A plurality of pixel electrodes 191 and a shielding electrode 9 which may be made of a transparent conductive material such as indium tin oxide (ITO), indium zinc oxide (IZO), or the like or a reflective metal such as aluminum, silver, chrome, or alloys thereof are formed on the passivation layer 180. One pixel electrode 191 includes a first subpixel electrode 191a and a second subpixel electrode 191b and an overall shape of the pixel electrode 191 may be rectangular. The first subpixel electrode 191a is surrounded by the second subpixel electrode 191b with a first domain dividing unit 91 interposed therebetween.

The first domain dividing unit 91 includes an oblique portion that extends to form a non-right angle with respect to the data line 171, the first gate line 121 or the second gate line 122 and forms mirror image symmetry with respect to a virtual central line extending in the first direction and bisecting the pixel electrode 191 into upper and lower parts.

The second subpixel electrode 191b includes a plurality of oblique cutout portions 92 parallel to the oblique portion of the first domain dividing unit 91 and one end of the oblique cutout portion 92 overlapping sides of the pixel electrode 191 includes a termination portion extending in a direction parallel to the sides of the pixel electrode 191. The oblique cutout portion 92 may further include a portion extending in the first direction at a portion where two oblique portions intersect each other. The oblique cutout portion 92 forms the mirror image symmetry with respect to the virtual central line extending in the first direction and bisecting the pixel electrode 191 into the upper and lower parts.

The oblique portion and the oblique cutout portion of the first domain dividing unit 91 may form approximately 45 degrees or 135 degrees with the first gate line 121 and the second gate line 122.

An area of the first subpixel electrode 191a may be smaller than that of the second subpixel electrode 191b.

The first subpixel electrode 191a receives a data voltage from the first drain electrode 175a through the first contact hole 185a and the second subpixel electrode 191b receives the data voltage from the second drain electrode 175b through the second contact hole 185b.

The second subpixel electrode 191b is connected with the shielding electrode 9. The shielding electrode 9 extends in the same direction as the first gate line 121 and is positioned between the first gate line 121 and the second gate line 122. The shielding electrode 9 is positioned between the first gate line 121 and the second gate line 122 to form a slit between the shielding electrode and the gate line, thereby shielding an electric field caused by the adjacent gate line. Accordingly, it is possible to prevent light leakage between the gate lines.

An alignment layer (not shown) may be formed on the pixel electrode 191.

Hereinafter, the upper panel 200 will be described.

A light blocking member 220 is formed on the insulating substrate 210. The light blocking member 220 prevents light leakage between the pixel electrodes 191. and the light blocking member 220 includes a frame portion that defines an opening that is aligned with the pixel electrode 191.

In addition, the light blocking member 220 is positioned on the substrate 210 and a step compensated pattern 20 is formed in the opening.

A plurality of color filters 230 are formed on the substrate 210 and the light blocking member 220. Most of the color filters may be present in a region surrounded by the light blocking member and elongate along the column of the pixel electrodes 191. Each color filter may display any one of three primary colors of red, green, and blue, and white.

Although only a white pixel including the step compensated pattern 20 is shown in the exemplary embodiment of the present invention, a pixel including the red, green, and blue color filters has the same structure as the white pixel. Therefore, a detailed description thereof will be omitted.

The color filters 230 are formed on the upper panel, but may be formed on the lower panel (not shown). That is, the color filters are positioned between the data line and the drain electrode and the pixel electrode to increase an alignment margin due to the color filters at the time of aligning the upper panel and the lower panel, thereby increasing an aperture ratio.

At least one of the light blocking member and the color filters may be positioned on the lower panel 100.

An overcoat 250 made of the transparent insulating material is formed on the color filters and the light blocking member.

The common electrode 270 receiving a common voltage Vcom while facing the pixel electrode 191 is formed on the overcoat 250. The common electrode 270 may be formed on an entire surface of the substrate so as to face the plurality of pixel electrodes 191, e.g., all the pixel electrodes 191.

The common electrode 270 includes plural pairs of second domain dividing units 71 having oblique portions substantially parallel to the oblique portion and the oblique cutout portion 92 of the first domain dividing unit 91 of the pixel electrode 191. Each second domain dividing unit 71 further includes a termination portion extending in a second direction or a first direction from the end of each oblique portion and the second domain dividing unit 71 further includes a portion extending in the first direction at a portion where two oblique portions intersect each other.

An alignment layer (not shown) may be applied onto the common electrode 270.

Two alignment layers of the lower panel 100 and the upper panel 200 may be vertical alignment layers.

The liquid crystal layer 3 interposed between the lower panel 100 and the upper panel 200 includes liquid crystal molecules having dielectric anisotropy. The liquid crystal molecules may be aligned so that their long axes are perpendicular to the surfaces of two panels 100 and 200 in the state in which no electric field is provided.

The first subpixel electrode 191a of the lower panel 100 forms a first liquid crystal capacitor Clca together with the common electrode 270 of the upper panel 200 and the liquid crystal layer 3 interposed therebetween and the second subpixel electrode 191b forms a second liquid crystal capacitor Clcb together with the opposed electrode 270 and the liquid crystal layer 3 interposed therebetween.

The first and second subpixel electrodes 191a and 191b to which the data voltage is applied generate the electric field in the liquid crystal layer 3 together with the common electrode 270 of the upper panel 200 to determine directions of the liquid crystal molecules of the liquid crystal layer 3 interposed between both electrodes 191 and 270. The inclined directions of the liquid crystal molecules are primarily determined by a horizontal component generated by distorting a main electric field substantially perpendicular to the surfaces of the variation panels 100 and 200 of the first domain dividing unit 91 and the oblique cutout portion 92 of the pixel electrode 191 and the second domain dividing unit 71 of the opposed electrode 270. The horizontal component of the main electric field is substantially perpendicular to sides of the first domain dividing unit 91 and the cutout portions 92 and second domain dividing unit 71 and the liquid crystal molecules are inclined in a direction substantially perpendicular to the sides. In the exemplary embodiment, there are approximately four inclination directions of the liquid crystal molecules are and when the inclination directions of the liquid crystal molecules are diversified as described above, a reference viewing angle of the liquid crystal display may be increased.

Further, differences between voltages of the first and second subpixel electrodes 191 and 191b and a voltage of the common electrode 270 are displayed as charged voltages of the first and second liquid crystal capacitors Clca and Clcb, i.e., a pixel voltage. The liquid crystal molecules vary in their alignment or inclined levels depending on the magnitude of the pixel voltage, and as a result, the level of polarization of light incident in the liquid crystal layer 3 varies. The variation in polarization is displayed a variation in transmittance of light by a polarizer. Thus, the liquid crystal display displays an image.

In the exemplary embodiment of the present invention, the data voltage which the first subpixel electrode 191a receives through the first switching element Qb is varied by the third switching element Qc and the auxiliary capacitor C3, such that the charged voltages of the first liquid crystal capacitor Clca and the second liquid crystal capacitor Clcb, i.e., the inclination levels of the liquid crystal molecules, vary.

Figure 6:
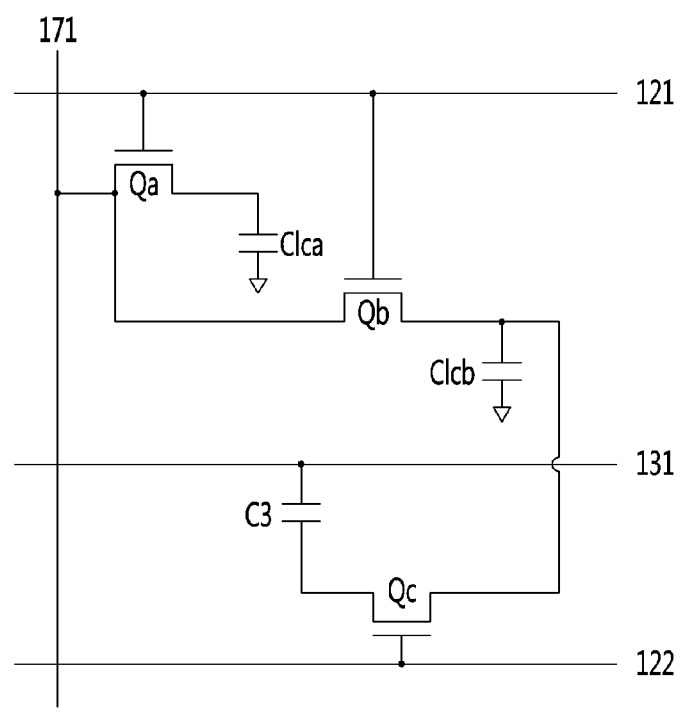
FIG. 6 is an equivalent circuit diagram for one pixel of the liquid crystal display of FIGS. 3 to 5.

FIG. 6 is an equivalent circuit diagram for one pixel of the liquid crystal display of FIGS. 3 to 5.

When a gate-on voltage is applied to the gate line 121, the first switching element Qa and the second switching element Qb connected thereto are turned on and the data voltage of the data line 171 is applied to the first and second subpixel electrodes (191a and 191b of FIG. 3).

The voltages are simultaneously applied to the first subpixel electrode 191a and the second subpixel electrode 191b to which the data voltages are applied when the first switching element Qa and the second switching element Qb are turned on and even after they are turned off, the liquid crystal capacitors Clca and Clcb sustain the applied voltage.

After the first switching element Qa and the second switching element Qb are turned off, the third switching element Qc is turned on. The third switching element Qc is connected with the second gate line to be driven differently from the first switching element and the second switching element. When the third switching element is turned on by the second gate electrode 121b, the voltage of the second liquid crystal capacitor Clcb connected with the auxiliary capacitor C3 drops. When the voltages of the first and second liquid crystal capacitors Clca and Clcb vary, luminance also varies and when the voltages of the first and second liquid crystal capacitors Clca and Clcb are appropriately adjusted, side visibility can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 3: Liquid crystal layer | 91: first domain dividing unit |
| 71: second domain dividing unit | 92: Cutout portion |
| 100: Lower panel | 110, 210: Insulating substrate |

<Description of symbols>

| | |
|---|---|
| 121: Gate line | 124a, 124b, 124c: Gate electrode |
| 131: Common voltage line | |
| 134: Protrusion portion of common voltage line | |
| 140: Gate insulating layer | 154a, 154b, 154c: Semiconductor |
| 163, 165: Ohmic contact | |
| 171: Data line | 173a, 173b, 173c: Source electrode |
| 175a, 175b, 175c: Drain electrode | |
| 180: Passivation layer | 185a, 185b: Contact hole |
| 191: Pixel electrode | 191a, 191b: Subpixel electrode |
| 200: Upper panel | 250: Overcoat |
| 270: Opposed electrode | |

What is claimed is:

1. A liquid crystal display, comprising:
a first insulating substrate;
a light blocking member positioned on the first insulating substrate, the light blocking member having a frame portion defining openings for pixels;
a step compensating pattern positioned on the first insulating substrate and in one of the openings;
a second insulating substrate facing the first insulating substrate;
a first electrode formed on the first insulating substrate in the same layer as a second domain dividing unit;
a second electrode facing the first electrode and disposed in the same layer as a first domain dividing unit; and
a liquid crystal layer interposed between the first electrode and the second electrode,
wherein the step compensating pattern corresponds to a pattern of the first domain dividing unit or the second domain dividing unit and extends at a non-right angle with respect to the light blocking member in a layout view of the liquid crystal display,
wherein the step compensating pattern and one of the first domain dividing unit and the second domain dividing unit are parallel,
wherein each of the pixels is one of a red pixel, a green pixel, a blue pixel, and a white pixel,
wherein the step compensating pattern is positioned in the white pixel,
wherein the red pixel, the green pixel, and the blue pixel include a red filter, a green filter, and a blue filter, respectively, and
wherein the white pixel further includes a color filter made of a transparent insulating material.

2. The liquid crystal display of claim 1, wherein:
the step compensating pattern is separated from its neighboring step compensating pattern by about 40 to 50 μm.

3. The liquid crystal display of claim 1, further comprising:
a thin film transistor positioned on the second insulating substrate and electrically connected with the second electrode; and
a gate line and a data line connected with the thin film transistor and crossing each other,
wherein the first domain dividing unit and the second domain dividing unit extend in a direction that intersects the gate line at a non-right angle.

4. The liquid crystal display of claim 3, wherein:
the second electrode includes a first subpixel electrode and a second subpixel electrode to which different voltages are applied.

5. The liquid crystal display of claim 4, wherein:
the second subpixel electrode receives a voltage lower than the first subpixel electrode; and
the liquid crystal display further includes a shielding electrode connected with the second subpixel electrode and extending in the same direction as the gate line.

6. The liquid crystal display of claim 5, wherein:
the shielding electrode is made of the same material as the pixel electrode on the same layer as the pixel electrode.

7. The liquid crystal display of claim 4, further comprising:
a first switching element and a second switching element connected with the first subpixel electrode and the second subpixel electrode, respectively.

8. The liquid crystal display of claim 7, wherein:
the gate line includes a first gate line and a second gate line,
the first switching element and the second switching element are connected with the data line and the first gate line, and
the liquid crystal display further includes a third switching element connected with the second gate line.

9. The liquid crystal display of claim 8, further comprising:
a common voltage line disposed in parallel to the gate line and receiving a predetermined voltage; and
an auxiliary capacitor connected with the third switching element and the common voltage line.

10. The liquid crystal display of claim 9, wherein:
the second subpixel electrode receives a voltage lower than the first subpixel electrode,
the liquid crystal display further includes a shielding electrode connected with the second subpixel electrode and extending in the same direction as the gate line, and
the shielding electrode is positioned between the first gate line and the second gate line.

11. The liquid crystal display of claim 10, wherein:
the shielding electrode is made of the same material as the pixel electrode on the same layer as the pixel electrode.

* * * * *